June 4, 1963    R. A. FRYKLUND    3,092,432
RECORDING APPARATUS

Filed Feb. 1, 1960    3 Sheets-Sheet 1

INVENTOR
ROBERT A. FRYKLUND
BY
ATTORNEY

June 4, 1963  R. A. FRYKLUND  3,092,432
RECORDING APPARATUS
Filed Feb. 1, 1960  3 Sheets-Sheet 2

INVENTOR
ROBERT A. FRYKLUND
BY *H. Vincent Harsha*
ATTORNEY

June 4, 1963  R. A. FRYKLUND  3,092,432
RECORDING APPARATUS

Filed Feb. 1, 1960  3 Sheets-Sheet 3

INVENTOR
ROBERT A. FRYKLUND
BY H. Vincent Harsha
ATTORNEY

United States Patent Office 3,092,432
Patented June 4, 1963

3,092,432
RECORDING APPARATUS
Robert A. Fryklund, Dedham, Mass., assignor to Raytheon Company, Lexington, Mass., a corporation of Delaware
Filed Feb. 1, 1960, Ser. No. 5,804
8 Claims. (Cl. 346—8)

This invention relates generally to recording apparatus for displaying radar information, said apparatus being used in the navigation of moving bodies, such as ships, and, more particularly, to means for stabilizing such a recording apparatus to provide a permanent indication of the true motion of a vessel and other moving or fixed objects in the vicinity of the vessel when the vessel is subject to maneuver or drift which causes it to proceed other than in a straight line course.

A recording apparatus for providing a permanent presentation of the course of an ocean going vessel and the position and motion of other fixed or moving objects in its general vicinity has been described in my patent No. 2,992,059, dated July 11, 1961. In that system, a planposition indicator (P.P.I.) radar scope presentation is transferred to a recording chart by an optical scanning system. The recording chart paper presents a permanent record of events occurring in a geographical area and allows an observer on a ship to distinguish between stationary and moving objects in the vicinity of the ship so that he can determine the best course to pursue to avoid collision with surrounding objects.

In the system described in the above-referenced copending application, the recording apparatus is fixedly mounted on the ship and the recording chart paper is moved at a speed proportional to the forward speed of the ship in order to provide a true motion display. Such a display is adequate for navigation purposes as long as the vessel is proceeding on a straight line course. However, when the vessel is maneuvering or drifting, the record becomes smeared and, as time passes, targets appear in different relative positions. Hence, the display may become confusing to the observer and, thereby, prevent a clear analysis of the changing geographical situation for navigation purposes. Thus, it is desirable to provide a means for orienting the recording chart in accordance with the true motion of the vessel over the ocean floor so that the chart may be stabilized when the vessel is moving other than in a straight line course.

This invention provides a means for stabilizing such a recording apparatus so that the recording chart remains fixed on a platen which is adapted to receive translational motions in orthogonal directions relative to a reference origin point, such as the ship's position, and rotational motions about the reference origin point as the ship turns and, thereby, changes its heading velocity direction.

The stabilizing system of the invention includes a means for mechanically combining motions proportional to the heading and drift velocity vector components of a ship. The combined motion represents a single velocity vector proportional to the true translational motion of the vessel over the ocean floor. The motion resulting from mechanically combining the heading and drift velocity components is imparted to a disc fixedly attached to a recording chart platen so that the recording chart is driven with a translational velocity corresponding to the true translational velocity of the vessel. The recording chart platen assembly is mounted on a turntable that is capable of being rotated about the reference origin point in accordance with the correct azimuth position of the ship as determined by a ship's compass repeater so that the chart is further oriented with respect to the ship's actual turning motions.

In one particular embodiment of the invention, motions proportional to the heading and drift velocity components may be mechanically combined by a structure which utilizes a sphere positioned between two pairs of rollers, said rollers contacting the sphere at four diametrically opposite points located in substantially the same plane. One pair of rollers is fixedly mounted with respect to the ship and contacts the sphere at opposite points of a first diameter corresponding to the X-axis of an orthogonal three-dimensional reference coordinate system. The X-axis is aligned with the center line of the ship. The other pair of rollers is also fixedly mounted with respect to the ship and contacts the sphere at opposite points of a second diameter perpendicular to the first diameter. The second diameter lies along the thwart-ship direction and, thus, corresponds to the Y-axis of the reference coordinate system. A rotating motion proportional to the heading velocity of the ship is imparted to one pair of rollers and a rotating motion proportional to the drift, or thwart-ship, velocity of the ship is imparted to the other pair of rollers.

A flat disc is placed on top of the sphere so as to contact the sphere at a single tangential point corresponding to the point of emergence of the Z-axis of the reference coordinate system. As the sphere is turned about the X and Y axes by the rotation of one or both pairs of rollers, the disc is driven in translation in a direction corresponding to the direction of the combined heading and drift velocity components. A recording chart platen which is fixedly attached to the disc is driven in accordance with the motion of the disc and, thus, moves in a direction corresponding to the true motion of translation of the ship over the ocean floor.

The disc and recording chart platen are mounted on a turntable arranged to rotate about the point of contact of the disc and the sphere. The turntable is rotatably positioned in azimuth in response to the operation of a motor controlled by a conventional gyro compass repeater in accordance with the turning motions of the ship. Thus, the recording chart is directionally stabilized so that the reference origin point moves in translation and in rotation across the paper in the same way that the ship is moving across the ocean floor.

The invention may be more easily described and its operation more easily understood with the help of the drawing in which.

Figure 1:
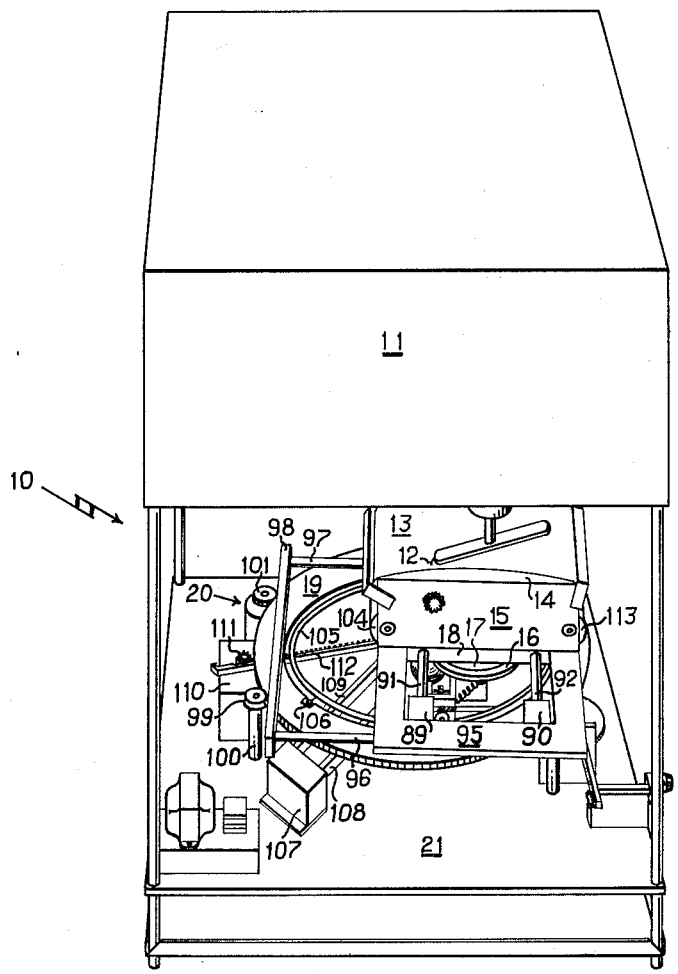
FIG. 1 shows an over-all pictorial view of a recording apparatus of a navigation system which utilizes a particular embodiment of the stabilizing system of the invention.

In FIG. 1 there is shown a structure 10 which houses a navigation system having a recording apparatus which utilizes a particular embodiment of the invention. The enclosed upper portion 11 of structure 10 houses a planposition-indicator cathode ray tube and optical scanning device used to transmit P.P.I. information to a stylus 12 for marking a paper chart 13. As mentioned previously, the cathode ray tube and optical scanning system is fully described in my previously referred-to patent and, hence, is not described in detail in this application.

Stylus 12 is used to mark the position and subsequent movement of the ship on which structure 10 is mounted, as well as the position and subsequent movement of other surrounding moving and stationary objects. A platen 14, upon which paper chart 13 is placed, is attached to a mounting ring 16 through a mounting block 18. Platen 14 is enclosed on two sides by panels 15, which provide a means for supporting paper supply and paper take-up rolls 113 and 104, respectively. A flat disc 17 is secured in the underside of mounting block 18. Disc 17 and, hence, platen 14 are capable of being moved in translation by a cross-way system described more fully in later paragraphs. The recording platen and cross-way system are secured to a turntable 19 that is rotatably driven by a motor and gear combination 20 which is actuated in accordance with the ship's azimuth position by a conventional ship's gyro compass repeater. Beneath disc 17 and in contact with it there is located a sphere and roller combination 22 which can only be partially seen in this figure. The sphere is mounted between two pairs of rollers and rotary motions are applied to each pair of rollers by a motor and gearing arrangement described more clearly with reference to FIGS. 2 and 3.

Figure 2:
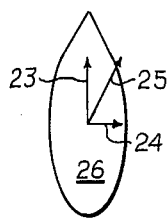
FIG. 2 shows a diagrammatic view of the geometric relationships which exist between the heading and drift velocity vectors of a moving vessel.
Figure 3:
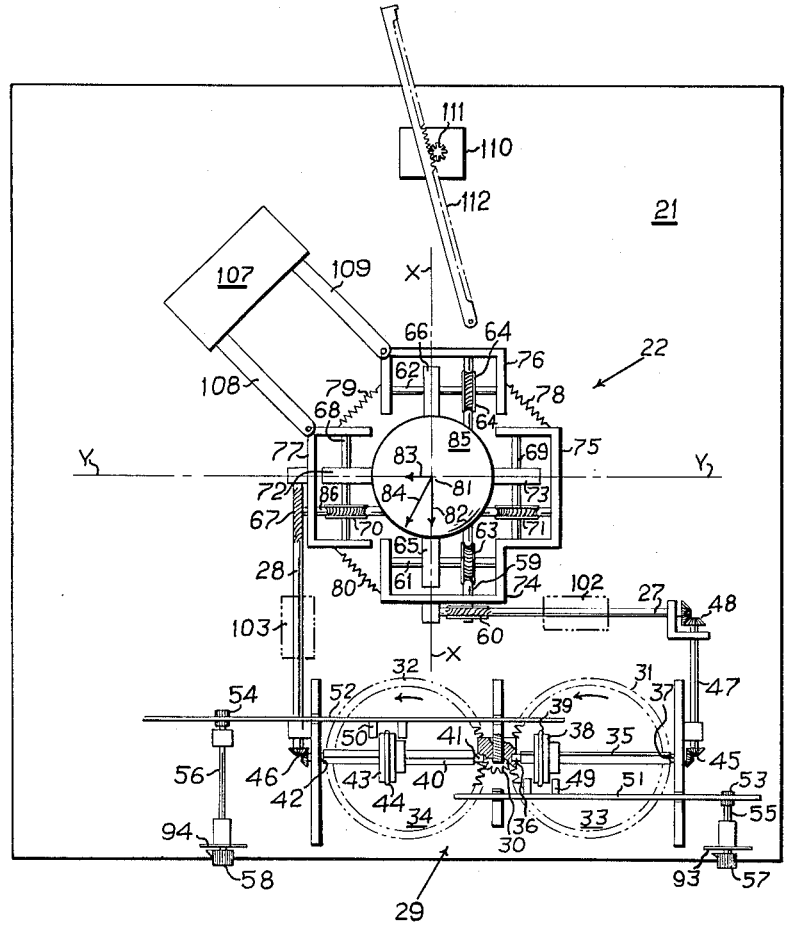
FIG. 3 shows a plan view of the sphere and roller arrangement used in the vector-combining system of the invention.

To understand the over-all operation of the stabilizing system of the invention, FIGS. 2 and 3 are first used to describe the basic operation of sphere and roller combination 22 which provides a motion of translation proportional to the true motion of translation of a ship over the ocean floor. A ship 26, shown schematically in FIG. 2, is assumed to be moving with a heading velocity having a magnitude and direction represented by a vector 23 and with a drift velocity having a magnitude and direction represented by a vector 24. The resultant magnitude and direction of the ship's translational motion is, thus, represented by a vector 25 which represents the vectorial summation of vectors 23 and 24.

There is shown in FIG. 3 a platform 21 on which there is mounted a means for developing a mechanical motion equivalent to the motion of the ship depicted in FIG. 2. A first rotary motion having a magnitude proportional to the heading velocity of the ship is provided on a shaft 27. A second rotary motion proportional to the magnitude of the drift velocity of a ship is provided on a second shaft 28. The mechanism for driving shafts 27 and 28 comprises a motor and gearing driver assembly 29. Driver assembly 29 includes a motor (not shown) driving a shaft on which there is provided a driving gear 30 rotating, for example, in a clockwise direction. Driving gear 30 imparts counter-clockwise rotations to driven gears 31 and 32 having flat surfaces 33 and 34 as shown.

A first shaft 35 mounted between bearings 36 and 37 has placed thereon a first wheel 38 having a rubber ring (39) mounted on its periphery in friction contact with surface 33 of gear 31. A second shaft 40 mounted between bearings 41 and 42 has placed thereon a second wheel 43 having a rubber ring 44 mounted thereon in friction contact with surface 34 of gear 32. The rotation of gears 31 and 32 causes a rotation of wheels 38 and 43 which, in turn, drives shafts 35 and 40. Shafts 35 and 40 operate bevel gear assemblies 45 and 46, respectively, for driving shafts 47 and 28. Shaft 47 in turn drives a bevel gear assembly 48 for causing a rotation of shaft 27.

The rates of rotation of wheels 38 and 43 and, hence, of shafts 27 and 28 depend on the positions of wheels 38 and 43 on gear surfaces 33 and 34. For example, when the wheels are at the center points of the gear surfaces, there is essentially no rotation of the wheels as gears 31 and 32 turn. As wheels 38 and 39 are moved outwardly away from the centers of the gear surfaces, the speeds at which they are rotated increases. Thus, by the proper positioning of wheels 38 and 43, it is possible to provide shaft motions proportional to known heading and drift velocities of a ship upon which the apparatus is mounted.

Positioning of the rubber ringed wheels is provided by a pair of brackets 49 and 50 attached to laterally movable racks 51 and 52 which are actuated by pinion gears 53 and 54, respectively. The positioning of pinion gears 53 and 54 is provided by shafts 55 and 56 which are turned by dial knobs 57 and 58 attached at their ends. The dial knobs can be set manually at particular positions with reference to markings on dial faces 93 and 94, said markings being calibrated in accordance with heading and drift velocity measurements which may be made independently by means not shown herein.

The motion of shaft 27 is transmitted to a shaft 59 through worm and gear combination 60. The motion of shaft 59 is then transmitted to shafts 61 and 62 through worm and gear combinations 63 and 64, respectively. Shafts 61 and 62 have rollers 65 and 66, respectively, mounted thereon, said rollers being in friction contact with a sphere 85 as shown in the figure.

The motion of shaft 28 is transmitted through worm and gear combination 67 to a shaft 86. The motion of shaft 86 is then transmitted to shafts 68 and 69, respectively, through worm and gear combinations 70 and 71. Shafts 68 and 69 have rollers 72 and 73 mounted thereon, said rollers being in friction contact with sphere 85 as shown. Shafts 61 and 69 are rotatably mounted in bearings located in U-shaped brackets 74 and 75 which are, in turn, rigidly fastened to platform 21. Shafts 62 and 68 are rotatably mounted in bearings located in U-shaped brackets 76 and 77. Brackets 76 and 77 are flexibly coupled to each other and to brackets 74 and 75 by springs 78, 79 and 80 so that the rollers are held in tension against sphere 85.

As shown in the figure, rollers 65 and 66 are oppositely disposed with respect to sphere 85 and contact the sphere at opposite ends of a diameter of the sphere along an axis X—X. Rollers 72 and 73 are oppositely disposed with respect to sphere 85 and contact the sphere at opposite ends of a diameter of the sphere along an axis Y—Y that is perpendicular to the X—X axis.

The X—X axis and the Y—Y axis represent two axes of a three-dimensional orthogonal coordinate system, a third, or Z—Z, axis of which may be conceived as being projected upwardly in FIG. 3 through the center of the sphere. The Z—Z axis may be considered to emerge from the top of the sphere at a point 81. Downward forces which may be imposed upon the sphere either because of its own weight or because of forces external to the sphere are borne by a castor 149 (shown diagrammatically in FIG. 4) mounted beneath the sphere and centrally located with respect to the sphere. The axis of the castor coincides substantially with the Z—Z axis of the coordinate system.

A rotation of rollers 65 and 66 causes the sphere to rotate about the Y—Y axis and imparts a tangential velocity to the sphere at point 81 as represented by the vector 82. Rotation of rollers 72 and 73 causes the sphere to rotate about the X—X axis and imparts a tangential velocity to the sphere at point 81 represented by the vector 83. If the two pairs of rollers are simultaneously rotated, the resultant motion imparts to the sphere a tangential velocity at point 81 represented by vecor 84 which is the vectorial summation of vectors 82 and 83. Vectors 82, 83 and 84 correspond to vectors 23, 24 and 25 of FIG. 2. Hence, it is possible by the correct setting of the speeds of rotation of shafts 27 and 28 to provide a motion of the point 81 so as to cause a tangential velocity proportional to the true translational motion of the ship 26 as represented by vector 25 in FIG. 2 and corresponding vector 84 in FIG. 3.

Figure 4:
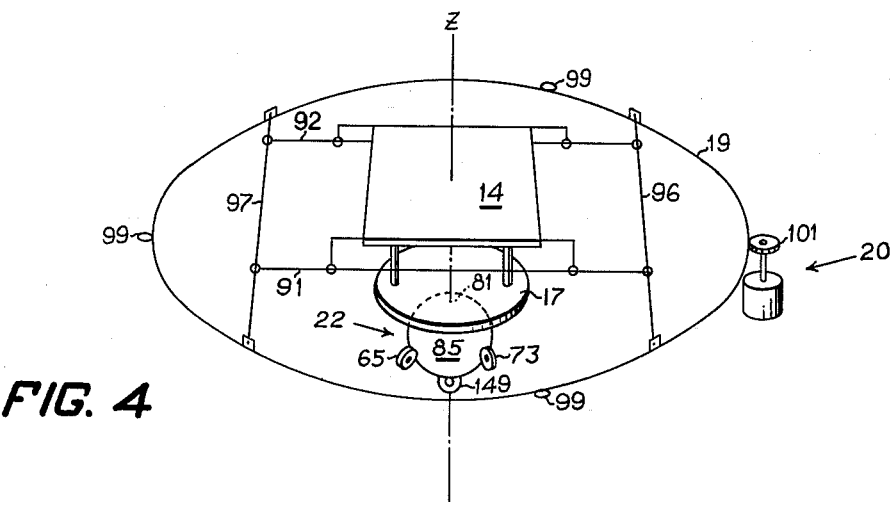
FIG. 4 shows a substantially schematic diagram of a portion of the recording apparatus stabilizing system of the invention that is used in conjunction with the vector combining system of FIG. 3.

The sphere and roller combination 22 described with reference to FIG. 3 cooperates with the disc and platen arrangement shown in FIG. 1 to provide a true motion indication. The over-all operation of the system is most easily described with reference to FIGS. 1 and 4, a portion of the structure shown pictorially in FIG. 1 being shown substantially schematically in FIG. 4. For clarity, the reference numerals in FIG. 4 correspond to the reference numerals used in FIG. 1. In FIG. 4, it is obvious that the sphere and roller arrangement, although shown only schematically, is supported and actuated as shown in FIG. 3.

In FIGS. 1 and 4, there is shown a flat disc 17 positioned at the top of sphere 85 and tangentially contacting it at point 81 (shown in FIG. 3). As the sphere is rotated by the driving rollers, the disc is driven in translation in accordance with the tangential velocity at the point of contact between the sphere and the disc. Disc 17 is attached to mounting ring 16 which is, in turn, secured to block 18 on which there is mounted a recording chart platen 14 as shown in FIG. 1. For clarity, the construction has been simplified in the schematic diagram of FIG. 4. Block 18 has drilled therein a pair of cylindrical bores so that it may be slidably positioned along a pair of rods 91 and 92 so that a first translational motion may be imparted to the recording chart platen in the direction of the rods. Rods 91 and 92 are fastened at each end to a rectangular frame 95 through mounting blocks, two of which, 89 and 90, are shown in FIG. 1. These mounting blocks have cylindrical bores drilled therein to allow rectangular frame 95 to be slidably positioned along a second pair of rods 96 and 97 so that a second translational motion may be imparted to the recording chart platen, said second motion being perpendicular to the motion provided along rods 91 and 92. Rods 96 and 97 are fixedly attached at each end to a pair of brackets, only one of which (bracket 98) is shown, which are in turn secured to an annular turntable 19.

Turntable 19 is supported by three bearing rollers, only one of which (bearing roller 99) may be seen here, placed at substantially 120° intervals around the periphery of the turntable. The bearing rollers are freely rotatable on posts, one of which (post 100) is shown, secured to platform 21. Turntable 19 has gear teeth disposed about its periphery, said teeth being engaged by a gear 101 connected to a shaft driven by a conventional gyro compass repeater motor so that the turntable is rotated in accordance with the correct azimuth position of the ship on which the apparatus is mounted.

The cooperation required between the various portions of the apparatus shown pictorially in FIG. 1 is perhaps more easily seen in the simplified schematic diagram of FIG. 4. From that figure, it can be seen that recording chart platen 14 has imparted thereto translational and rotational motions resulting from the actuations of sphere and roller combination 22 and turntable 19, respectively. The translational motion is controlled in accordance with the heading and drift velocity components of the ship on which the apparatus is mounted and the rotational motion is controlled in accordance with the turning motion of the ship. The recording chart is, therefore, oriented in accordance with the true motion of the ship over the ocean floor.

In recording the course of the ship through any particular geographic area covered by the chart paper, it should be noted that the recording chart paper exposed to the stylus is fixed with relation to the ship. In the preferred mounting arrangement of the sphere and disc, the sphere drives the disc and, hence, the platen toward the observer. This motion provides the observer with the impression that the origin is moving away from his observation point and, hence, presents a similar representation to that which he would observe, for example, in looking through the cabin windows of his ship. In the same manner, the geography of the situation relative to the observer rotates about him in a manner characteristic of a relative p.p.i radar scope presentation. Thus, a display is presented to the observer wherein fixed targets remain fixed on the recording chart and moving targets plot their own true motion courses.

If the range of the basic radar system used with this recording apparatus is changed, the scale factors of velocity and distance must also be changed correspondingly. In order to provide a presentation which is correctly proportional for all ranges in which the radar may be used, it is necessary to provide a gearing change at the input shafts 27 and 28 to change the rates of rotation of these shafts in accordance with the change in range. Therefore, appropriate gear boxes 102 and 103, shown in phantom in FIG. 3, can be inserted and actuated either mechanically or electromechanically so that the correct gear ratios may be chosen as the range is switched by the operator.

It is clear that the paper chart exposed on the surface of the platen represents a particular geographical area. As the ship moves within that area it will, over a period of time, approach the edge of the paper chart as it tends to move into a new geographical area not encompassed by the exposed chart paper. In order to maintain a correct geographical record, it is necessary to re-orient the paper to a new reference starting portion and to change the paper whenever the ship moves into a new geographical region. Provision may, therefore, be made for allowing the operator to change the paper by actuating a motor (not shown) connected to take-up roll 104. The motor may be actuated by a push button available to the operator.

The paper may also be changed automatically as shown with reference to FIGS. 1 and 3. In FIG. 1, a switching ring 105 is flexibly mounted around the inner periphery of annular turntable 19. Disc 17 may approach inner ring 105 from any direction and, upon striking the inner ring at any point, one of a plurality of microswitches mounted adjacent the ring is actuated. In a particular embodiment of the invention, four microswitches are used for this purpose, one of which (microswitch 106), is shown in FIG. 1. Thus, no matter where the disc strikes the inner ring, at least one of the microswitches is actuated.

Actuation of a microswitch brings about a simultaneous changing of the paper and a returning of the recording chart platen to a reference starting position. Actuation of the microswitch, first of all, closes a circuit (not shown) and, thereby, causes the excitation of the paper drive motor in a manner similar to that caused by the operation of the push button mentioned previously.

In addition, actuation of the microswitch closes a circuit which causes an excitation to be applied to a solenoid 107 shown mounted on platform 21 in FIGS. 1 and 3. Solenoid 107 causes a pair of connecting rods 108 and 109, fastened at one end to U-shaped brackets 76 and 77, to be drawn away from the sphere so that the tension of the rollers against the sphere due to springs 78 and 80 is removed and the sphere is then able to rotate freely. Simultaneously, an excitation is applied to a motor 110 which causes a rotation of pinion gear 111. Pinion gear 111 is engaged to a rack 112, which is secured at one end to mounting block 18, so that the disc and platen assembly is automatically drawn back to a reference starting position at the same time that a fresh expanse of paper is supplied to the platen. This automatic return, or flyback, system and paper changing system allows a permanent recording of the ship's motion as it occurs in a new geographical situation.

A system described with reference to FIGS. 1-4 shows one particular embodiment of the invention for stabilizing a recording apparatus. In that embodiment, motions proportional to the heading and drift velocity of a ship are vectorially combined and the vectorial combination is oriented relative to the turning motion of a ship so that the true motion of a ship may be permanently recorded.

Substantially the same principle may be used in another embodiment of the invention for obtaining motions proportional to the heading and drift velocity components of a ship with reference to a fixed coordinate system, such as represented by conventional north-south, east-west directions. These components may be converted, for example, to electrical signals and applied to a fixed plotting table for plotting the ship's course on a fixed geographical map. Such a system requires the resolution of the ship's heading and drift velocity components from a moving reference coordinate system (ship coordinates) to a fixed reference coordinate system (the north-south, east-west compass coordinates). In a particular embodiment of such a system, motions proportional to the heading and drift velocity components are mechanically combined to provide a single motion relative to the ship's coordinates. The combined vector motion is oriented with reference to a fixed compass coordinate system. The newly oriented combined vector motion is then resolved into orthogonal components of motion relative to the compass coordinate system. Motions proportional to these components may be converted to electrical signals and applied to a plotting table in order to plot the motion of the ship relative to north-south and east-west directions.

Figure 5:
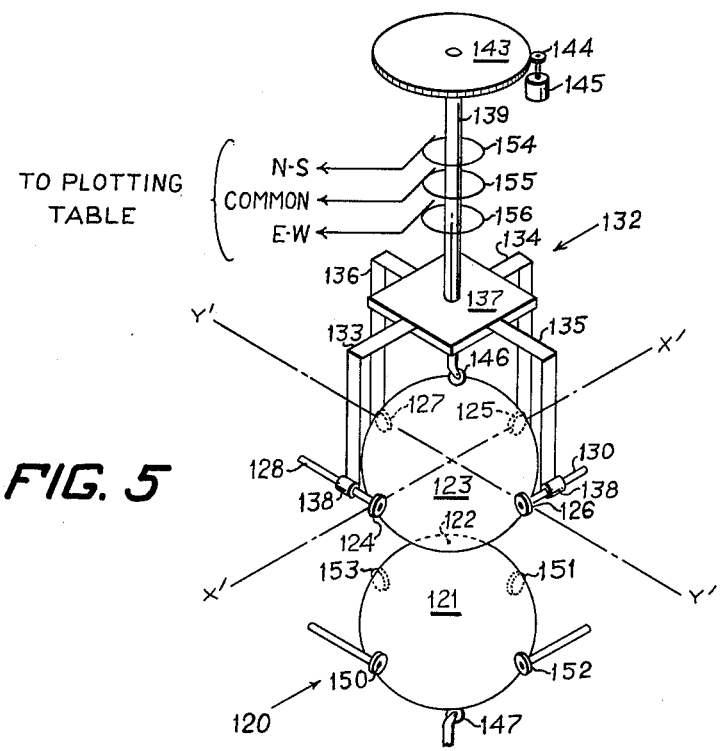
FIG. 5 shows a substantially schematic diagram of a part of a recording apparatus of a navigation system utilizing another embodiment of the invention.

The particular structure utilized for such a resolution system is shown schematically in FIG. 5. In that figure, a sphere and roller combination 120, similar to that shown as combination 22 in FIGS. 1–4, is used to combine motions proportional to the orthogonal heading and drift velocity components of a ship and, thus, to provide a single tangential velocity at the top of a sphere 121 at point 122. Such a system has already been previously described with reference to FIG. 3.

A second sphere 123 is positioned at the top of sphere 121 and contacts it at the point 122. A first pair of rollers 124 and 125 are positioned to contact sphere 123 at opposite ends of a first diameter of the sphere along an X'—X' axis which corresponds, for example, to the north-south compass direction. A second pair of rollers 126 and 127 are positioned to contact the sphere at diametrically opposite points along a Y'—Y' axis perpendicular to the X'—X' axis, said Y'—Y' axis corresponding to the east-west compass direction. Rollers 124—127 are spring loaded against sphere 123 and rotate upon rotation of the sphere. Rollers 124—127 are each mounted on shafts, two of which, 128 and 130, are shown with relation to rollers 124 and 126, respectively. The shafts associated with rollers 124 and 125 are aligned parallel with the Y'—Y' axis and the shafts associated with rollers 126 and 127 are aligned parallel with the X'—X' axis. The shafts are supported on a frame 132 comprising arms 133—136 each attached at one end to a platform 137 and attached at their other ends to cylindrical bearing holders 138 (only two of which are shown) through the openings of which the shafts are rotatably supported.

Platform 137 has mounted thereon a fixed shaft 139 which corresponds with the vertical Z-axis of the spheres. This shaft has a gear 143 mounted thereon. Gear 143 meshes with a pinion gear 144 driven by a ship's compass repeater 145. Spheres 121 and 123 are held between castors 146 and 147 contacting the upper and lower spheres, respectively.

Frame 132 and, hence, upper sphere 123 may be rotated relative to the lower sphere about the point of contact 122 by the action of gears 143 and 144 in response to the ship's compass repeater so that the directions of the X'—X' and Y'—Y' axis always correspond to the north-south and east-west compass directions as the ship moves in translation and rotation over the ocean floor. When lower sphere 121 is moved by the rotation of rollers 150—153 associated therewith, a motion is imparted to the upper sphere such that both spheres have rotation on the same plane with the axis parallel. The upper sphere in turn drives rollers 124—127.

If motions proportional to the heading and drift velocity components of the ship's motion, as measured in the moving ship's reference coordinate system is imparted to the lower rollers, the upper rollers provide shaft rotations proportional to the orthogonal components of the heading and drift velocities, as measured in the fixed north-south and east-west compass coordinate system. Thus, the overall system shown in FIG. 5 acts as a vector-combiner and vector-resolver system wherein two components in a moving coordinate system are resolved into two components in a fixed coordinate system, said moving coordinate system being capable of rotation with respect to the moving coordinate system.

The motions of shaft 128, 130 may be transferred to a plotting table so that the true motion of a ship with reference to north-south and east-west directions may be plotted and permanently recorded thereby.

In the system shown schematically in FIG. 5, the input and the output motions are shown as continuous rotations. It is possible to utilize this structure in a digital type of a system wherein information concerning the input velocity components may be obtained as discrete intelligence. For example, the original heading and velocity components in the ship's reference coordinate system may be obtained as increments of distance travelled, in which case they may be applied to the shafts of rollers 150—153 by conventional electromagnetically operated ratchet and pawl arrangements. If it is desired that the output components in the north-south, east-west coordinate system also be obtained as digital information, the shafts may be connected to conventional toothed cam and switching arrangements. The cams and switches need only be used in association with shafts 128 and 130, for example, and rollers 125 and 127 may be run as idlers. For a 1:1 conversion ratio between coordinate systems, the cams on the output shafts should be arranged to have as many lobes as the ratchets on the input shafts have teeth. Because the cam and switching systems are rotating, slip rings 154—156 are provided for connection to the switches. The output information may then be supplied to the plotting table.

The embodiments described herein and shown in the figures do not necessarily represent the only embodiments of the invention as others will occur to those skilled in the art within the scope of the invention. Hence, the invention is not to be construed to be limited to these particular embodiments except as defined by the appended claims.

What is claimed is:

1. A system for stabilizing a recording platform mounted on a moving body capable of translational and rotational motions, said stabilizing system comprising, in combination, means for producing motions proportional to the orthogonal components of the translational motion of said moving body; means for combining said orthogonal components of motion into a single motion; means attached to said recording platform and responsive to said single motion for imparting said single motion to said recording platform whereby said platform is driven in translation; and means for rotatably orienting said recording platform in response to the rotational motions of said moving body.

2. A system for stabilizing a recording platform mounted on a moving body capable of translational and rotational motions, said stabilizing system comprising, in combination, means for producing orthogonal motions proportional to the orthogonal components of the translational motion of said moving body; means for vectorially combining said orthogonal components of motion into a single translational motion; means attached to said recording platform and responsive to said single motion for imparting said single translational motion to said recording platform whereby said platform is driven in translation; and means for rotatably orienting said recording platform in response to the rotational motions of said moving body.

3. A system for stabilizing a recording platform mounted on a moving body capable of translational and rotational motion, said moving body having a heading velocity and a drift velocity, said stabilizing system comprising, in combination, means for producing a first motion proportional to said heading velocity; means for producing a second motion proportional to said drift velocity; means for combining said first and second motions to produce a third motion proportional to the vector sum of said first and second motions; means for imparting said third motion to said recording platform; and means for rotatably orienting said recording platform in response to the rotational motion of said moving body, said recording platform thereby moving in translation and in rotation in accordance with the motion of said moving body.

4. A system for stabilizing a recording platform with reference to a fixed coordinate system, said platform being mounted on a moving body capable of translational and rotational motions, said stabilizing system comprising, in combination, means for producing orthogonal motions proportional to the orthogonal components of the translational motion of said moving body, said orthogonal components being referred to a moving coordinate system; means for vectorially combining said orthogonal components into a single translational motion referred to said moving coordinate system; means attached to said recording platform and responsive to said single translational motion for imparting said single translational motion to said recording platform whereby said platform is driven in translation; and means for rotatably orienting said motion imparting means and said recording platform in response to the rotational motion of said moving body whereby said platform is stabilized with reference to said fixed coordinate system.

5. A system for stabilizing a recording platform relative to a first coordinate system fixed with relation to the points of a compass, said platform being mounted on a moving body capable of translational and rotational motions, said stabilizing system comprising, in combination, means for producing orthogonal motions proportional to the orthogonal components of the translational motion of said moving body, said orthogonal components being referred to a second coordinate system fixed relative to said moving body, one of said components being in the forward direction of said moving body and the other of said orthogonal components being in a direction perpendicular to said forward direction; means for vectorially combining said orthogonal components into a single translational motion referred to said second coordinate system; means attached to said recording platform and responsive to said single translational motion for imparting said single translational motion to said recording platform whereby said platform is driven in translation; and a gyro compass repeater means for rotating said recording platform in response to the rotational motion of said moving body relative to said first coordinate system, whereby said platform is stabilized with reference to said first compass coordinate system.

6. A system for stabilizing a recording platform mounted on a moving body having heading and drift velocity components, said stabilizing system comprising a sphere; a first pair of rollers contacting said sphere at opposite points of a first diameter of said sphere; a second pair of rollers contacting said sphere at opposite points of a second diameter perpendicular to said first diameter; means for rotating said first pair of rollers at a rate proportional to said heading velocity of said moving body; means for rotating said second pair of rollers at a rate proportional to said drift velocity of said moving body, said sphere thereby being rotated in response to the rotations of said roller pairs; disc means tangentially contacting said sphere, the point of contact of said sphere and said disc means thereby moving with a tangential velocity representing the vector sum of said heading and drift velocity components of said moving body, said disc means being fixedly attached to said recording platform for moving said recording platform in accordance with the motion of said disc means; and means for rotatably orienting said recording platform and said disc means in response to the rotational motion of said moving body relative to a reference coordinate system whereby said recording platform is stabilized with respect to said reference coordinate system.

7. A system for stabilizing a recording platform relative to a first coordinate system fixed with relation to the points of a compass, said platform being mounted on a moving body capable of translational and rotational motions, said stabilizing system comprising, in combination, means for producing orthogonal motions proportional to the orthogonal components of the translational motion of said moving body, said orthogonal components being referred to a second coordinate system fixed relative to said moving body, one of said components being in the forward direction of said moving body and the other of said orthogonal components being in a direction perpendicular to said forward direction; means for vectorially combining said orthogonal components into a single translational motion referred to said second coordinate system; means attached to said recording platform and responsive to said single translational motion for imparting said single translational motion to said recording platform whereby said platform is driven in translation; a gyro compass repeater means for rotating said recording platform in response to the rotational motion of said moving body relative to said first coordinate system whereby said platform is stabilized with reference to said first compass coordinate system; and means mounted on said moving body for moving said recording platform to an initial reference starting position relative to said second coordinate system.

8. A system for stabilizing a recording platform relative to a first coordinate system fixed with relation to the points of a compass, said platform having recording chart paper positioned thereon and being mounted on a moving body capable of translational and rotational motions, said stabilizing system comprising, in combination, means for producing orthogonal motions proportional to the orthogonal components of the translational motion of said moving body, said orthogonal components being referred to a second coordinate system fixed relative to said moving body, one of said components being in the forward direction of said moving body and the other of said orthogonal components being in a direction perpendicular to said forward direction; means for vectorially combining said orthogonal components into a single translational motion referred to said second coordinate system; means attached to said recording platform and responsive to said single translational motion for imparting said single translational motion to said recording platform whereby said platform is driven in translation; a gyro compass repeater means for rotating said recording platform in response to the rotational motion of said moving body relative to said first coordinate system whereby said platform is stabilized with reference to said first compass coordinate system; and means mounted on said moving body for moving said recording platform to an initial reference starting position relative to said second coordinate system and for simultaneously moving an unmarked portion of recording chart paper into position on said platform.

References Cited in the file of this patent
UNITED STATES PATENTS

| 1,069,842 | Kaempfe | Aug. 12, 1913 |
| 1,280,406 | Couchois | Oct. 1, 1918 |
| 1,701,582 | Mengden | Feb. 12, 1929 |
| 2,116,508 | Colvin | May 10, 1938 |
| 2,507,567 | Garnier | May 16, 1950 |
| 2,538,226 | Anderson et al. | Jan. 16, 1951 |
| 2,916,202 | Beishline | Dec. 8, 1959 |

FOREIGN PATENTS

| 904,441 | France | Nov. 6, 1945 |